June 7, 1960
C. F. HOBSON, JR
2,939,929
ELECTRIC CIRCUIT BREAKER
Filed Aug. 22, 1957
2 Sheets-Sheet 1
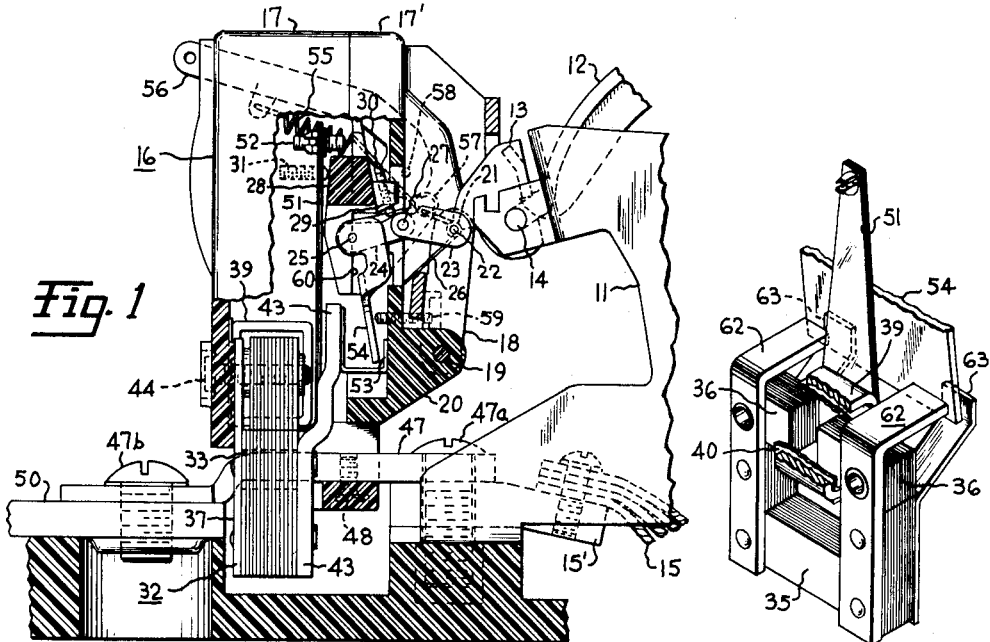
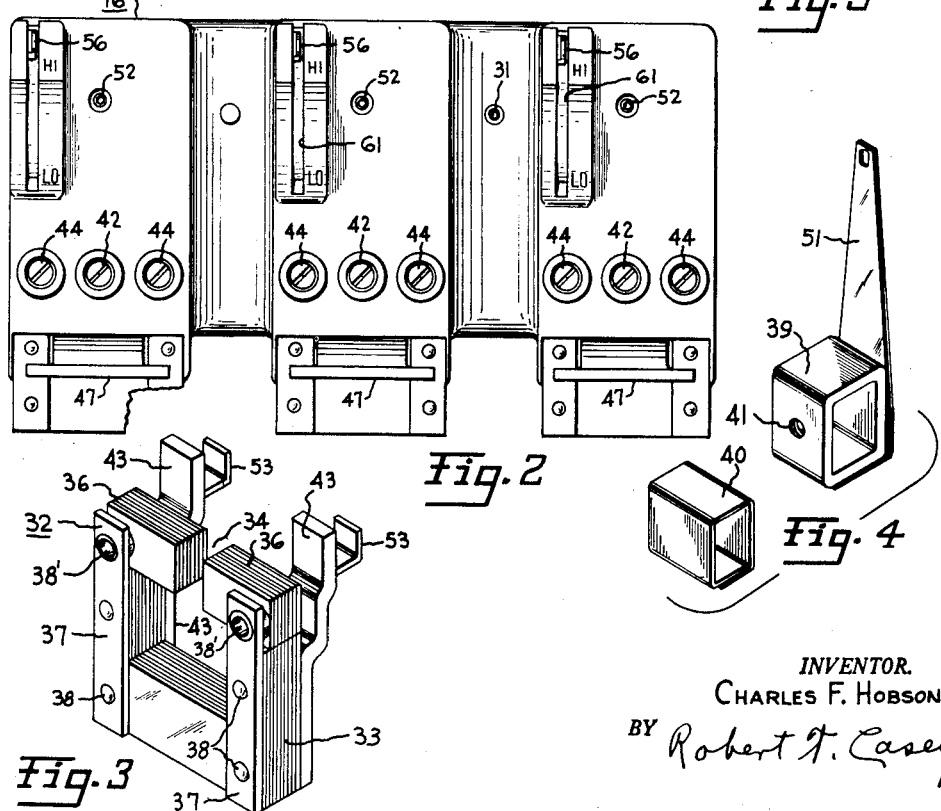
INVENTOR.
CHARLES F. HOBSON
BY Robert F. Casey
ATTORNEY June 7, 1960  C. F. HOBSON, JR  2,939,929
ELECTRIC CIRCUIT BREAKER
Filed Aug. 22, 1957  2 Sheets-Sheet 2
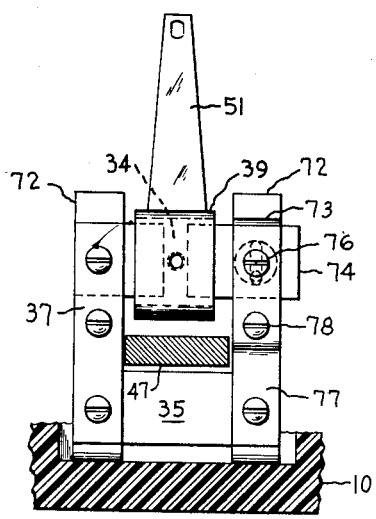
Fig. 7
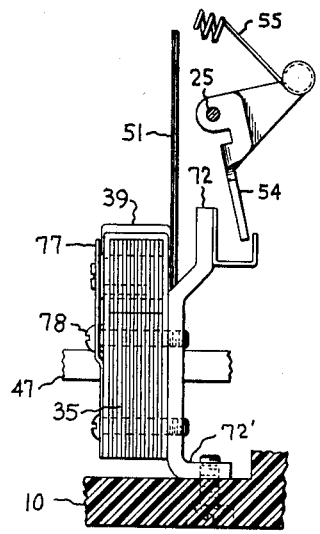
Fig. 8
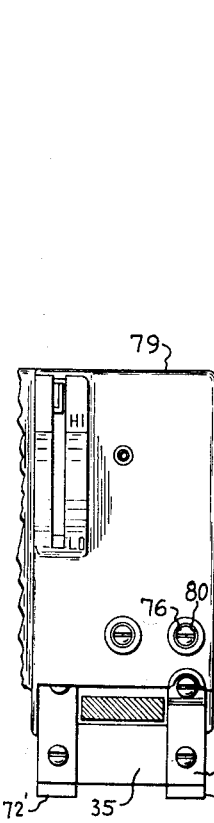
Fig. 10
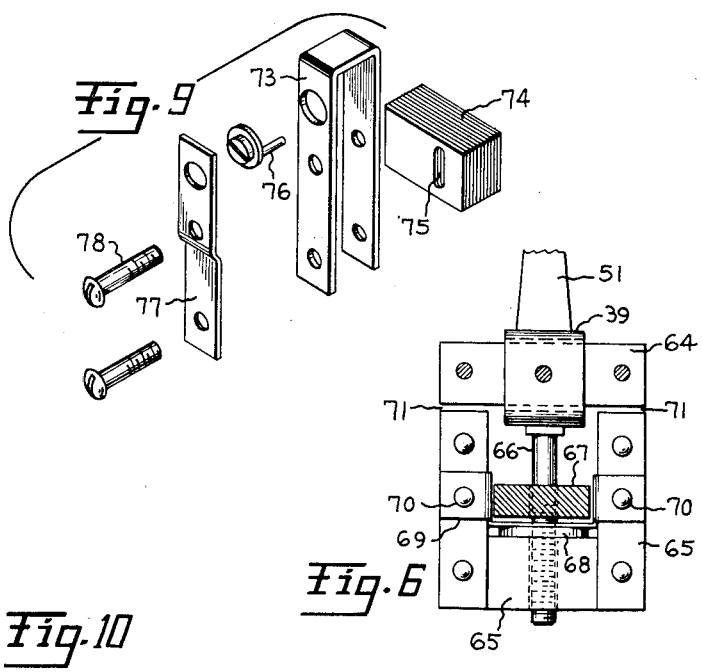
Fig. 9
Fig. 6
INVENTOR.
CHARLES F. HOBSON
BY Robert A. Casey
ATTORNEY

United States Patent Office 2,939,929
Patented June 7, 1960

2,939,929
ELECTRIC CIRCUIT BREAKER

Charles F. Hobson, Jr., Southington, Conn., assignor to General Electric Company, a corporation of New York Filed Aug. 22, 1957, Ser. No. 679,605

14 Claims. (Cl. 200—88)

The present invention relates to tripping devices for electric circuit breakers and especially to tripping devices including combined thermal and magnetic tripping means.

In circuit breakers which are adapted to control relatively high values of current, such, for instance, as 600 to 800 amperes, it is desirable to utilize a combined thermal and magnetic tripping device including a thermal tripping element heated in response to current in the main circuit by means comprising a transformer type of coupling. Prior art structures of this general type have, however, suffered from several drawbacks, including excessive size and expense, and inaccuracy of operation, particularly of the magnetic tripping portion. Some of such structures, for example, have required separate magnetic core structures for the thermal transformer coupling and for the magnetic field piece, thereby requiring excessive space and additional expense. Other constructions utilizing a single core member have had the serious disadvantage of an undesirable interaction between the thermal and magnetic tripping means. In such designs, for example, a magnetic trip device set to cause tripping at a desired current level when the thermal means is in heated condition, will be found to cause tripping at a much lower current level when the thermal element is in a relatively cool condition. This is due to the change in resistance of the secondary circuit of the transformer and a consequent change in the effect of such current on the flux conditions in the single core member.

Accordingly, it is an object of the present invention to provide a combined thermal and magnetic tripping device of the transformer type which is compact and relatively inexpensive.

It is another object of the present invention to provide a combined thermal and magnetic tripping device, including transformer type of coupling for the thermal device, which is adapted to utilize the same magnetic core for both the thermal and magnetic tripping means without undesirable interaction therebetween.

It is another object of the present invention to provide a combined thermal and magnetic tripping means incorporating a transformer-type action, in which the thermal and magnetic tripping portions may be accurately and independently adjusted.

In accordance with my invention, I provide a combined thermal and magnetic tripping device including a single magnetic core member having a high reluctance portion, a primary energizing conductor associated with the core member, a secondary winding adapted to be energized by the core member, a bimetallic member adapted to be heated by the secondary winding, and a magnetic armature magnetically in parallel with the high reluctance portion of the core member, the bimetallic member and the armature each being arranged to cause tripping operation of the device. The high reluctance portion of the core member is varied to adjust the action of the thermal tripping device, while the spacing between the armature and the core member is varied to adjust the action of the magnetic tripping device.

In accordance with another important aspect of my invention, the secondary winding is positioned so that at least a portion thereof surrounds the high reluctance section of the core member. There is, with this construction, no part of the main core member whose saturation or reluctance is greatly affected by current conditions in the secondary winding. Resistance changes in such winding such as caused by its wide changes in temperature, therefore do not have a great effect on the reluctance of the main core member or, consequently, upon the action of the armature member.

In accordance with another aspect of the invention, the secondary winding comprises a continuous tubular section of highly conductive material and the thermal tripping element is rigidly interconnected therewith to form a unitary structure. This assembly is fixedly mounted as an independent unit on an insulating base out of direct thermally conductive contact with any other metallic or good heat conducting elements. This greatly increases the efficiency of the thermal tripping means. It also aids in ensuring accurate functioning of the thermal tripping element. Thus the positioning of the thermal element can be more easily controlled since it is not affected by the accuracy of fit of the secondary winding on the magnetic core member.

Further objects and advantages of the present invention will be more particularly pointed out in the following detailed description and the scope of the invention will be particularly pointed out in the appended claims.

Referring to the drawings,

Figure 1 is a side elevation view partly in section showing a circuit breaker trip unit constructed in accordance with the invention, as installed in an electric circuit breaker;

Figure 2 is a front elevation view of the trip unit of Figure 1;

Figure 3 is a perspective view of the magnetic core assembly utilized in Figure 1;

Figure 4 is a perspective exploded view, of the secondary winding and thermal tripping element assembly and an insulating sleeve used in conjunction therewith;

Figure 5 is a perspective view with a portion broken away of a magnetic core and secondary winding and bimetallic strip assembly, showing a modified construction;

Figure 6 is an elevation view of another modification of the invention of Figure 1;

Figure 7 is an elevation view of another embodiment of the invention;

Figure 8 is a side elevation view of the embodiment of Figure 7;

Figure 9 is an exploded perspective view of portions of the device of Figure 7; and Figure 10 is a fragmentary front elevation view of a trip unit incorporating the modification of Figures 7-9.

Referring to the drawings, the invention is shown as embodied in an electric circuit breaker having an insulating supporting base 10 and an operating mechanism frame 11 mounted thereon. The operating mechanism frame 11 serves to support a suitable operating mechanism, not shown, for operating a set of circuit breaker contacts between open and closed circuit position. Means is provided for conducting current to the contacts controlled by the mechanism, by means of a multistrand flexible conductor 15 connected to a terminal 15' mounted on the base 10. An operating mechanism suitable for use herewith is shown in application Serial No. 679,607 filed concurrently herewith by E. B. Judd, et al. assigned to the same assignee as the present invention, and now issued as Patent No. 2,921,169, January 12, 1960. The operating mechanism includes a tripping lever 12 and a releasable member 13, each of which is pivotally supported between opposed side wall portions of the operating mechanism frame 11. The operating mechanism includes energy storing means, not shown, urging the trip lever 12 upwardly as viewed in Figure 1, and the lever 12 urges the releasable member 13 counterclockwise about its pivotal support 14.

In order to cause the release of the releasable member 13 on the occurrence of predetermined current conditions, there is provided a removable tripping device or trip unit indicated generally at 16. The trip unit 16 includes a two-part insulating housing comprising portions 17 and 17'. The trip unit 16 also includes a latch member 18 pivotally supported on a pivot pin 19 which extends through aligned openings in a boss 20, integral with the housing part 17'.

The latch member 18 carries a latch roller 21 supported on a pin 22 extending between spaced apart portions of the latch member 18, adapted to engage the releasable member 13 to normally restrain it from movement.

A pair of toggle links 23 and 24, respectively, are interconnected between the pivot pin 22 of the latch 18 and a stationary pivot pin 25. A toggle biasing spring 26 is also provided, having a portion encircling the pin 22 and having outer portions engaging the toggle link 23 and the latch member 18 respectively, to urge the knee 27 of the toggle linkage in an upwardly or overset direction.

Supported on a pivotal axis coaxial with the pin 25, there is provided a common trip bar 28 of insulating material extending transversely across the trip unit 16 and having portions adapted to be actuated by means responsive to current in each of the three poles of the circuit breaker respectively in a manner to be described. The common trip bar 28 includes an intergral boss 29 carrying a toggle adjusting screw 30. A trip bar adjusting screw or stop screw 31 is also provided, threadedly engaged in the housing portion 17 of the trip unit 16.

The train of forces existing in the apparatus as thus far described is as follows: The trip lever 12 is urged upwardly by energy storage means, not shown, and urges the releasable member 13 in a counterclockwise direction about its pivotal support 14; the engagement between the releasable member 13 and the roller 21, carried by latch member 18, is such as to urge the latch member 18 for rotation in a counterclockwise direction about its pivotal support 19 by a cam-like action; the member 18, in tending to rotate in a counterclockwise direction, urges the toggle linkage 23 and 24 toward collapsed condition so as to move the toggle knee 27 upwardly as viewed in Figure 1; the toggle link 24 engages the toggle adjusting screw 30 and urges the common trip bar 28 for rotation in a counterclockwise direction about its pivotal axis 25; movement of the common trip bar 28 in a counterclockwise direction is limited by its engagement with the adjusting screw 31 which is carried by the trip unit housing portion 16. Thus the releasable member 13 is releasably restrained in the position shown in Figure 1, and in turn restrains the trip lever 12.

Rotation of the common trip bar 28 in a clockwise direction causes the toggle adjusting screw 30 to rotate the toggle link 24 in a clockwise direction thereby moving the toggle linkage 23, 24 to and through a straightened condition to a collapsed condition downwardly. This permits the latch member 18 to move counterclockwise under the influence of the releasable member 13, allowing the member 13 to rotate and in turn to release the trip lever 12.

Certain aspects of the trip unit mechanism disclosed herein form a part of the subject matter disclosed and claimed in applications Serial Numbers 679,590 now Patent No. 2,884,497, April 28, 1959, and 679,606 each filed concurrently herewith jointly by H. M. Stevens and R. W. Marshall and assigned to the same assignee as the present invention.

For the purpose of causing rotation of the common trip bar 28 in a clockwise direction to cause such tripping of the circuit breaker, in response to certain predetermined current conditions, provision is made for thermal or time-delay tripping means and also magnetic or instantaneous acting tripping means. The combined thermal and magnetic tripping means includes a magnetic core assembly indicated generally at 32 in Figures 1 and 3. Referring particularly to Figure 3, the magnetic core assembly 32 includes a generally rectangular laminated core 33 having an air gap 34 in one wall thereof. The core 33 comprises a generally U-shaped main portion and two opposed portions 36 attached thereto by suitable means, such as by brackets 37. The brackets 37 are attached to the core member 33 by suitable fastening means, such as by rivets 38 and 38', the rivets 38' being of the tubular type to permit the passage of mounting screws 44.

A short-circuited unitary turn secondary winding 39 is provided on the core 33. The loop 39 is preferably constructed so as to have a low resistance in order that the maximum heating power be obtained from a given amount of magnetic flux from the single-turn primary. At the same time, it is important that the size or mass of the turn 39 be as small as possible so that very little of the power generated shall be used in heating the turn itself. The turn 39 is therefore preferably made of highly conductive material such as copper. In addition, the turn 39 is preferably formed as a homogeneous ring of metal such as by cutting it off as a section of seamless tubing in order to eliminate the possibility of variations in resistance from a faulty joint or seam. The secondary winding 39 preferably encircles the juxtaposed pole portions 36, but is thermally and electrically insulated therefrom by suitable insulating means 40. The turn 39 is provided with a tapped hole 41, by means of which it is adapted to be rigidly mounted on the insulating case portion 17 of the trip unit housing by suitable means such as by a fastening screw 42.

Magnetic pole extensions 43 are provided for operating a magnetic armature in a manner to be described, and are attached to the core member 33 by the rivets 38. The entire magnetic assembly including the core 33 and magnetic pole extensions 43, is mounted on the insulating casing portion 17 by means of screws or rivets 44 passing through aligned holes in the housing portion 17, the brackets 37 and the pole pieces 36. The heads of such screws and rivets 42 and 44 may be and preferably are covered over with a suitable insulating filler material, not shown.

A main current conductor 47 is provided, mounted on the insulating casing portion 17 of the trip device by suitable means such as by mounting screw 48 and has a portion passing through the central aperture of the magnetic core member 33. The conductor 47 has one end connected to the terminal member 15' by means of screw 47a for providing current to the flexible conductor 15, and has its other portion connected to a main terminal 50 of the circuit breaker by means of screw 47b. Thus the current controlled by the contacts of the circuit breaker passes through the magnetic core assembly 32, so that the conductor 47 serves as a single turn primary winding of a transformer to induce a voltage and consequent current in the short circuited turn 39.

The cross sectional area of the short circuited turn 39, is so chosen that even though the turn is constructed of high conductivity material, the currents generated therein are such as to cause heating thereof in accordance with the magnitude of the current carried in the primary conductor 47.

In order to provide usable movement in accordance with the heat generated in the short circuited turn 39, there is provided a bimetallic strip 51 which has one end fixedly attached to a wall of the loop 39 by suitable means such as by welding or brazing. In order to make possible good thermal contact between the bimetallic strip 51 and the turn 39, the member 39 preferably constitutes a section of rectangular tubing and the bimetallic member is generally L-shaped and has its extreme end portion attached to one wall of the member 39 and has its adjacent portion extending at right angles and in close contact with a second wall thereof. The remaining portion of the strip 51 extensd beyond the loop 39 and is provided at its outer end with an adjustable thermal calibrating screw 52.

The bimetallic strip 51 and the secondary turn 39 constitute an independently supported unitary structure firmly anchored to the insulating base 17 by means of screw 42. A relatively liberal clearance is also preferably provided between the turn 39 and the core portions 36. This provides an effective thermal and mechanical isolation of the assembly comprising the bimetallic strip and the secondary turn 39. Thus there is no highly heat-conductive path between this assembly and any element capable of storing a substantial amount of heat. At the same time, this construction ensures that the position of the bimetallic member will not be affected by relatively small changes in the position of the magnetic core assembly.

During a "thermal" type of tripping operation, current flowing in the primary single-turn winding 47 induces a varying magnetic field which threads the secondary single-turn winding 39. The winding 39, being short-circuited, has high eddy currents generated therein which quickly heat the turn 39, the heat being rapidly transmitted to the bimetallic strip 51 by conduction. The bimetallic strip 51 is constructed and arranged to deflect to the right as viewed in Figure 1, causing the calibrating screw 52 to engage the common trip bar 28 and to rotate it in a clockwise direction to cause tripping as previously described.

The magnetic or instantaneous action portion of the combined thermal and magnetic tripping means in accordance with the present invention includes a first pair of magnetic pole extensions 43 which are attached to the magnetic core member 33 by means of the rivets 38. A second pair of magnetic pole extensions 53 are mounted on the outer portions of the first pole extensions 43. A magnetic armature 54 is pivotally supported on the same pivotal axis 25 as the common trip bar 28, and includes a portion adapted to extend across the pole extensions 43 and 53, magnetically in parallel with air gap 34. The armature 54 is biased in a counterclockwise direction against the second pole extensions 53 as viewed in Figure 1 by means of a biasing spring 55 which extends between an outer portion of an adjusting lever 56 and extension 57 of the armature 54. The adjusting lever 56 is adapted to be moved about its pivotal support 58 so as to move the adjusting spring 55 closer to or farther away from the pivotal support 25 of the armature 54 whereby to vary the effective biasing force of the spring 55 on the armature. The outer portion of the lever 56 projects through a slot 61 in the housing portion 17 so as to be accessible for movement from outside the trip unit enclosure. An armature adjusting screw 59 is provided which is threadedly engaged in the insulating housing portion 17'. The armature 54 is adapted to travel a short distance toward the poles 43 when attracted thereto without moving the common trip bar 28. Following its initial short movement, the armature 54 engages the extensions 60 on the common trip bar 28 and rotates it in a clockwise direction, to cause tripping of the circuit breaker in the manner previously described.

Current flowing in the conductor 47 creates a magnetic field which passes through the magnetic body 33 and across the air gap 34. A portion of such flux however also passes through the pole extensions 43, through the auxiliary pole portions 53, and through the armature 54. On normal currents, therefore, the effect of such magnetic flux is to tend to hold the armature 54 in retracted position against the armature adjusting screw. On the occurrence of high overload current conditions, however, the intermediate portions of the auxiliary poles 53 become magnetically saturated, and a pull is created directly between the extremities of the pole portions 43 and the armature 54, causing the armature 54 to move to the left as viewed in Figure 1 and to engage the trip bar portions 60 to cause tripping as previously described.

It will be observed that the poles 43 are magnetically in parallel with the poles 36. In accordance with my invention, therefore, I may omit the poles 43 and utilize the pull of the magnetic field then existing between the poles 36 and the armature 54 to attract the armature directly if desired.

In accordance with the present invention, the air gap 34 is preferably chosen so as to give the desired level of operation of the thermal device 51. For example, when used with circuit breakers of high current rating, such for example as 800 amperes, the air gap is made relatively wide. This decreases the flux linking the secondary turn 39 so as not to unduly overheat the short circuited turn 39 or the bimetallic strip 51, a typical gap being .281 inch. When used with circuit breakers of lower ampere rating such for example as 600 amperes, the air gap 34 is made relatively smaller so as to increase the flux linkages, an air gap of .156 inch being typical. Such variation of the air gap 34 is readily accomplished according to the present invention, since the pole pieces 36 are made separately from the remaining portion of the magnetic core assembly, and varying size pole pieces may be selectively utilized in accordance with the particular requirements.

As mentioned previously, the short circuited turn 39 is positioned to include between the ends thereof a high reluctance portion of the magnetic core member 32, i.e., air gap 34. This construction affords an effective isolation of the transformer thermal tripping arrangement and the instantaneous magnetic trip arrangement, although both are combined in one device. This result apparently is due to the fact that there is no part of the main core member whose reluctance is greatly affected by current conditions in the secondary coil. Experiment has demonstrated that with the construction shown, there is no significant difference in the current intensity required to cause actuation of the magnetic armature when the secondary winding 39 is in heated condition i.e., approximately 110° C., compared to that required when it is in a relatively cold condition i.e., room temperature or below. Similar experiment has shown, however, that when a continuous portion of the core member, a saturable section, is included through the secondary turn 39, such as in conventional transformer construction, the reluctance of this path changes so greatly when the resistance of the secondary turn 39 changes, that the tripping point of the magnetic armature varies from about 600% of normal rating of an 800 ampere circuit breaker when the turn 39 is at room temperature, to about 1200% of such rating when the turn 39 is heated to the normal bimetal operating temperature which it attains when the circuit breaker is carrying its rated current.

While I have shown an air gap 34 as the high reluctance portion of the core member 33, I may also utilize a saturable section or a "bridged" air gap as such high reluctance portion, in which the cross-sectional area of such section is made less than that of the main portion of the core.

In Figure 5 there is shown a modification of the magnetic structure of Figure 1. In this modification, the pole pieces 62 are also adapted to serve as brackets for holding the pole pieces 36 to the U-shaped portion 35 of the magnetic assembly. This eliminates the need for separate brackets such as 37 of Figure 3. The auxiliary poles 63 of Figure 5 are attached directly to the U-shaped member 35. The operation of the modification of Figure 5 is the same as that described in connection with the form of Figure 1.

In Figure 6 there is shown an embodiment of the invention which is suitable for use in circuit breakers where only thermal tripping is desired. In this embodiment, the pole pieces 36 of Figure 3 are replaced by an integral magnetic member 64 passing through the secondary winding 39 which as in Figure 1, is fixedly attached to the breaker casing. A U-shaped magnetic core 65 is also provided which is adjustably mounted on a threaded stud 66 fixedly attached to the short circuited turn 39 by suitable means, such as by welding or brazing. The main conductor 67 is provided with an opening generally centrally thereof through which the stud 66 freely passes. The U-shaped core member 65 has a circular rotatable nut 68 which is trapped between the bight portion of the U-shaped member 65 and a retaining piece 69 attached to the U-shaped member 65 by suitable means such as by rivets 70. Rotation of the nut 68 causes it to move up or down on the stud 66. Since the nut 68 is trapped with respect to the core 65, it carries the core 65 up or down on the stud 66 with it. The core 65 is also preferably guided for straight line movement up and down by suitable bosses or guiding surfaces molded in the insulating casing of the trip unit, not shown. The insulating casing is also preferably provided with an aperture, not shown, through which a portion of the adjustable nut 68 is accessible for movement from outside the trip unit casing. Adjustment of the U-shaped core member up and down with respect to the core 64 provides a wide range of adjustment of the coupling of the primary conductor 67 to the secondary conductor 39 by varying the series air gaps 71.

In Figures 7-10, there is shown a further embodiment of the invention. In this embodiment, the same general construction is used as shown in Figures 1-3, excepting that means is also provided for adjustably setting the air gap from outside the trip unit housing. In accordance with this embodiment of the invention, the magnetic pole pieces 72 include integral mounting foot extensions 72' which provide means for mounting the magnetic core member assembly to the insulating base 10. A generally U-shaped bracket member 73 is provided, which includes a portion extending on opposite sides of the pole member 35. The magnetic pole piece 74 is slidably mounted both within the short circuited turn 39 and within the bight portion of the bracket 73. The pole portion 74 also includes an elongated hole 75 for a purpose to be described. An eccentric adjusting member 76 is provided, having a flanged head portion and an eccentric shaft extending therefrom, adapted to extend into the opening. The adjusting member 76 is adapted to be retained in position by a retaining strip 77 having an offset portion adapted to overlie the flanged portion of the head of the adjusting member 76. A tightening screw 78 is provided for locking the adjusting member 76 in any desired position. In use, when it is desired to adjust the air gap 34, it is only necessary to loosen the clamping screw 78 and adjust the member 76 as with a screwdriver. The action of the eccentric extension of the member 76 in the opening 75 causes the pole piece 74 to move laterally within a predetermined range. As shown in Figure 10, the trip unit housing 79 preferably includes an opening 80 providing access to the adjusting screw 76.

It will be readily apparent that many modifications of the invention may be made by those skilled in the art, and I therefore wish to have it understoood that it is intended by the appended claims to cover all such modifications as fall within the true spirit and scope of the invention.

What I claim as new and desire to secure by Letters Patent of the United States is:

1. An electric circuit breaker comprising a magnetic core member having spaced apart pole portions defining a first air gap, a primary conductor for said core member, a secondary conductor for said core member positioned in said air gap, a bimetallic strip adapted to be heated in accordance with current generated in said secondary conductor, an armature adjacent said core member and defining with said core member an air gap in parallel with said first air gap, means for adjustably varying at least one of said air gaps independently of the other of said gaps, and means operable by each of said bimetallic strip and said armature for causing tripping operation of said circuit breaker.

2. An overload protective device comprising a magnetic core member having a high reluctance section, a primary conductor adapted to energize said magnetic core member, a secondary winding adapted to be energized by said magnetic core member at least a portion of said secondary winding surrounding said high reluctance section, a bimetallic strip adapted to be heated in response to current generated in said secondary winding, a magnetic armature magnetically in parallel with said high reluctance section and means associated with said bimetallic strip and said armature for causing tripping operation of said device.

3. An overload protective device comprising a transformer including a magnetic core member having at least two spaced pole portions providing an air gap, a primary conductor, a secondary conductor, said secondary conductor having a relatively low temperature and resistance when initially energized and a relatively high temperature and resistance when in steady state energized condition whereby initial secondary current is substantially greater than steady state secondary current, a bimetallic strip adapted to be heated in accordance with said secondary current, means operable by said bimetallic strip for actuating said trip device, an armature adjacent said core member between said pole portions, means operable by said armature for actuating said trip device, said secondary conductor being positioned in and bridging said air gap.

4. An overload protective device comprising a magnetic core member having a pair of spaced apart pole portions defining an air gap therebetween, a primary conductor adapted to energize said magnetic core member, a short-circuited secondary winding between said poles of said magnetic core member in said air gap, and a bimetallic strip member mounted on said short-circuited secondary winding in close thermal contact therewith.

5. An overload protective device comprising a magnetic core member having a pair of spaced apart pole portions, a primary conductor adapted to energize said magnetic core member, a short-circuited secondary winding extending between said poles of said magnetic core member, a bimetallic strip member mounted on said secondary winding in close thermal contact therewith, a magnetic armature magnetically in parallel with said pole portions, and means associated with said bimetallic strip and said armature for causing tripping operation of said device.

6. An overload protective device comprising a magnetic core member having a pair of spaced apart pole portions defining an air gap therebetween, a primary conductor adapted to energize said magnetic core member, a short-circuited secondary winding extending between said pole portions, an elongated bimetallic strip mounted on said secondary winding in close thermal contact therewith, a pair of magnetic pole extensions attached to said magnetic core member and spaced apart to define an air gap magnetically in parallel with said first air gap, and a movable magnetic armature adapted to be attracted to said pole extensions upon the occurrence of predetermined current conditions in said primary conductor and means cooperable with said bimetallic strip and said armature for causing tripping operation of said device.

7. An overload protective device as set forth in claim 6, said device also including a second set of magnetic pole extensions defining an air gap magnetically in parallel with said second magnetic pole air gap and including portions positioned on the opposite side of said movable armature member from said first pole extensions, and a saturable magnetic section between said first and second pole extensions.

8. An overload protective device comprising a magnetic core member having spaced apart pole portions defining an air gap therebetween, a primary conductor adapted to energize said magnetic core member, a short-circuited secondary winding on said magnetic core member and bridging said air gap, a bimetallic strip member mounted on said secondary winding, and means for adjustably varying said air gap.

9. An overload protective device comprising a generally U-shaped magnetic core member having opposed side portions, an extension carried by one of said side portions of said U-shaped core member and extending toward the other of said side portions to define a pair of spaced apart pole portions having an air gap therebetween, a short-circuited secondary winding on said magnetic core member and bridging said air gap, an elongated strip of bimetallic material having one end fixedly mounted on said secondary winding, a primary conductor adapted to energize said magnetic core member, said pole extension being movable toward and away from said opposed side of said magnetic core member to vary the length of said air gap, and means for adjustably positioning said pole extension.

10. An overload protective device comprising a generally U-shaped magnetic core member having opposed side portions, a pole extension on at least one of said side portions extending toward the other of said side portions to define a pair of spaced apart pole portions having an air gap therebetween, a short-circuited secondary winding on said magnetic core member and bridging said air gap, an elongated bimetallic strip having one end fixedly mounted on said secondary winding, a primary winding adapted to energize said magnetic core member, means for adjustably positioning said pole extension with respect to said opposed side of said magnetic core member whereby to vary the length of said air gap, said adjusting means comprising a member rotatably carried by said magnetic core member and having an eccentric projection thereon, said pole extension having an opening therein adapted to receive said eccentric projection.

11. An overload protective device comprising a generally U-shaped magnetic core member having opposed side portions, a pole extension on at least one of said side portions and extending toward the other of said side portions to define a pair of pole portions having an air gap therebetween, a single turn short-circuited secondary winding surrounding said magnetic core member and bridging said air gap, an elongated bimetallic strip having one end fixedly mounted on said secondary winding, a primary winding adapted to energize said magnetic core member, means slidably retaining said pole extension upon said magnetic core member, and means for adjustably positioning said pole extension comprising a rotatable adjusting member having a flanged head portion and an eccentric projection, a clamping bracket carried by said magnetic core member having an aperture therein adapted to receive a portion of said flanged head portion and to overlie the flange portion of said adjusting means, and a clamping screw passing through said clamping member and threadedly engaging said core member for clamping said clamping member against said adjusting member.

12. An overload protective device comprising an insulating base, a magnetic core member fixedly mounted on said insulating base, a primary conductor mounted on said insulating base and adapted to energize said magnetic core member, a short-circuited secondary winding surrounding said magnetic core member and fixedly mounted on said base independently of said core member, and an elongated strip of bimetallic material having one end thereof fixedly mounted on said secondary winding and having its other end movable in response to warpage of said bimetallic strip, and means operable by said other end of said bimetallic strip for causing tripping operation of said device.

13. An overload protective device as set forth in claim 12, wherein the secondary winding comprises a seamless tubular section of highly conductive material.

14. An overload protective device as set forth in claim 12 wherein the secondary winding and the bimetallic strip are substantially insulated thermally and electrically from contact with all electrically and thermally highly conductive elements of said mechanism except each other.

References Cited in the file of this patent

UNITED STATES PATENTS

| 1,110,152 | Steen | Sept. 8, 1914 |
| 1,692,486 | Cohn | Nov. 20, 1928 |
| 1,722,741 | Getchell | July 30, 1929 |
| 2,340,957 | Grissinger | Feb. 8, 1944 |
| 2,379,323 | Titus | June 26, 1945 |
| 2,631,272 | Smith | Mar. 10, 1953 |
| 2,676,242 | Wistenburg | Apr. 20, 1954 |

FOREIGN PATENTS

| 252,697 | Great Britain | Nov. 4, 1926 |
| 839,467 | France | Jan. 4, 1939 |
| 1,017,161 | France | Sept. 10, 1952 |